United States Patent [19]

Käufl et al.

[11] Patent Number: 4,903,042

[45] Date of Patent: Feb. 20, 1990

[54] METHOD OF AND APPARATUS FOR MAKING THERMOCOPIES

[75] Inventors: Hans U. Käufl, Oberschleissheim; Hans J. Vedder, Puchheim, both of Fed. Rep. of Germany

[73] Assignee: AGFA-Gevaert AG, Leverkusen, Fed. Rep. of Germany

[21] Appl. No.: 349,630

[22] Filed: May 10, 1989

[30] Foreign Application Priority Data

May 25, 1988 [DE] Fed. Rep. of Germany ....... 3817625

[51] Int. Cl.$^4$ .......................... G01D 15/10; G01D 9/42
[52] U.S. Cl. ................................ 346/76 L; 346/1.1; 346/108
[58] Field of Search ....................... 346/1.1, 76 L, 108

[56] References Cited

U.S. PATENT DOCUMENTS 3,978,247 8/1976 Braudy et al. ............... 346/76 L X
3,999,918 12/1976 Landsman ..................... 346/76 L X
4,525,722 6/1985 Sachdev et al. .............. 346/76 L X
4,819,018 4/1989 Moyroud et al. ............... 346/108 X Primary Examiner—George H. Miller, Jr.
Attorney, Agent, or Firm—Michael J. Striker

[57] ABSTRACT

A method of and an apparatus for making thermocopies in which a receiving material and an ink carrier member are synchronously advanced into a sublimation area opposite each other in a predetermined relationship therebetween, and the ink carrier member is heated linewise by a modulated laser beam to provide for pixelwise heating of the ink carrier member to enable transfer of an ink layer of a predetermined density from the ink carrier ribbon to the receiving material.

14 Claims, 4 Drawing Sheets

METHOD OF AND APPARATUS FOR MAKING THERMOCOPIES

BACKGROUND OF THE INVENTION

The invention relates to a method of and an apparatus for making thermocopies by a thermosublimation transfer in which an ink carrier ribbon and a receiving material are brought opposite each other into a sublimation area in a predetermined spaced relationship relative to each other, and the ink carrier member is heated pixelwise for transferring an ink layer of a predetermined density from the ink carrier member to the receiving material.

Apparatuses for performing the above described method are known. In all these apparatuses, the ink carrier ribbon is heated by a heating element. A relatively high temperature and a relatively low thermal inertia, with maximum allowable magnitude (about 100 um), as well as relatively great electrical power of a recording head (200-2000 mW) required per pixel, results in that the working life of the recording heads is limited, and a large number of pixels on the recording head leads to waste of heat. Because of such factors as thermal inertia of the recording head, sublimation velocity of the ink, the recording time per pixel is relatively large (about 10 ms). Therefore, for producing large format images, an unacceptable time interval is required.

SUMMARY OF THE INVENTION

The object of the invention is to provide a method of and apparatus for making thermocopies which would enable making copies with large number of pixels (i.e., 20,000,000 pixel) in an acceptable time. This object is achieved by providing a method and an apparatus in which a modulated laser beam is used for heating the ink carrier ribbon.

Heating of the ink carrier ribbon with a laser beam to enable sublimation eliminates the foregoing drawbacks. As in known laser printers, the laser beam scans respective lines. However, in contrast to the known laser printers, the modulated laser beam scanning a line several times applies to each pixel an equally metered power during sublimation period whereby a color tone density, which depends on the modulated laser power, can be exactly controlled. In this way, all pixels of a line are equally controlled and heated, and the line can be recorded in about 10 ms. This also enables to achieve a high pixel density (300 dpl) and a high printing speed for a large format (i.e., 300 sec for A3 format). Also, printing of multicolor half-tone copies becomes possible The present invention as to its construction so to its mode of operation, together with additional objects and advantages thereof, will be best understood from the following description of the preferred embodiments with reference to the accompanying drawings.

DESCRIPTION OF THE PREFERRED EMBODIMENT

Figure 1:
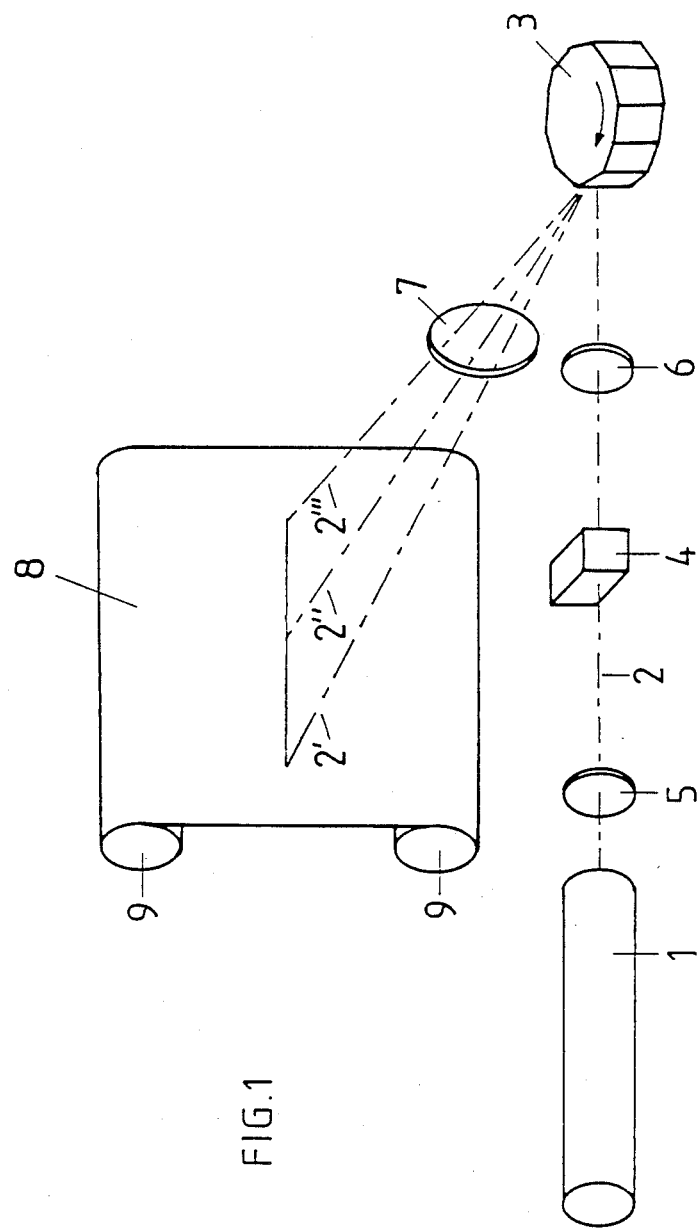
FIG. 1 shows a perspective simplified principal view of a known laser apparatus for heating lines of an ink carrier member.

FIG. 1 shows a laser 1 with beam 2, which afterbeing reflected from polygonal mirror 3, follows lines 2', 2'', and 2'''; a beam modulator 4; and schematically shown beam focussing optics 5, 6, and 7. The laser apparatus shown in FIG. 1 is used together with a thermocopying apparatus shown in FIG. 2 or FIG. 3. In all Figures, identical elements are designated with the same reference numerals.

Figure 2:
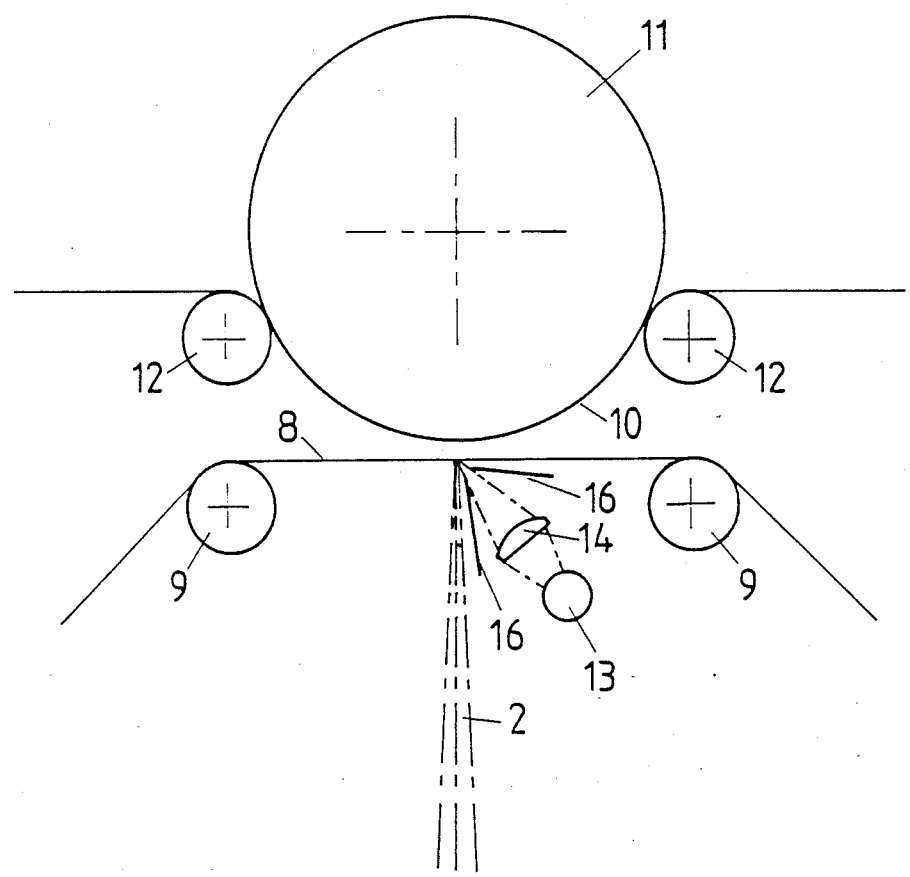
FIG. 2 shows a side view of modified elements of an apparatus according to the present invention.
Figure 3:
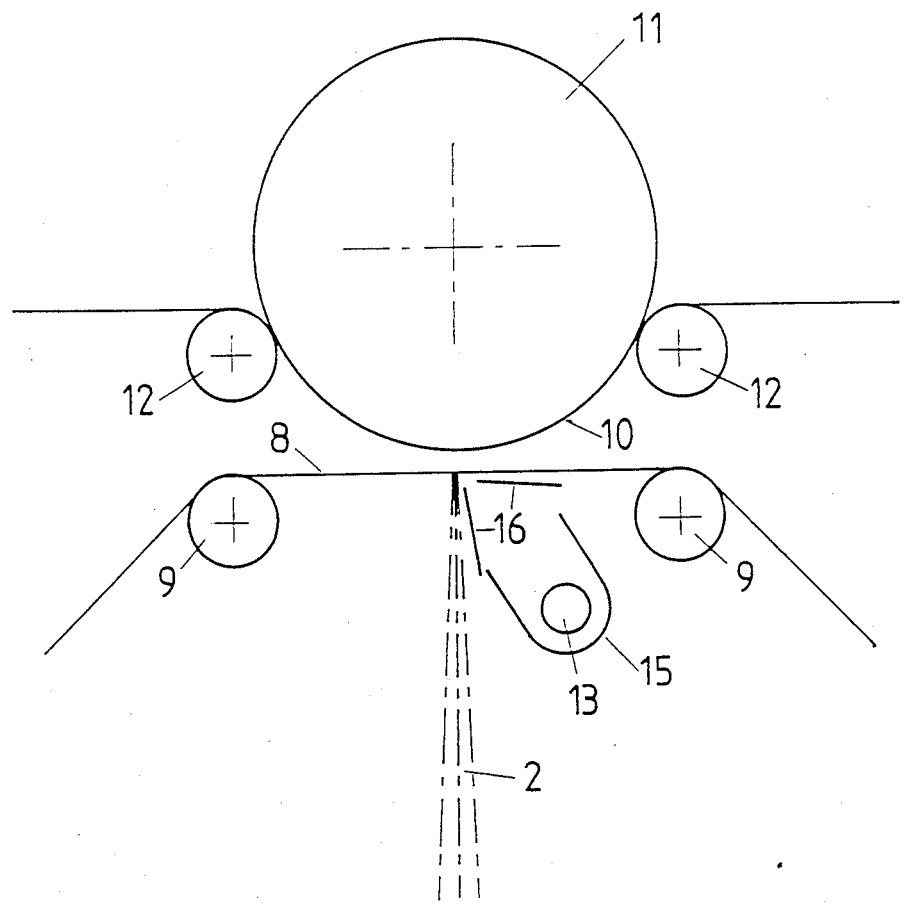
FIG. 3 shows another embodiment of an apparatus according to the present invention.
Figure 4:
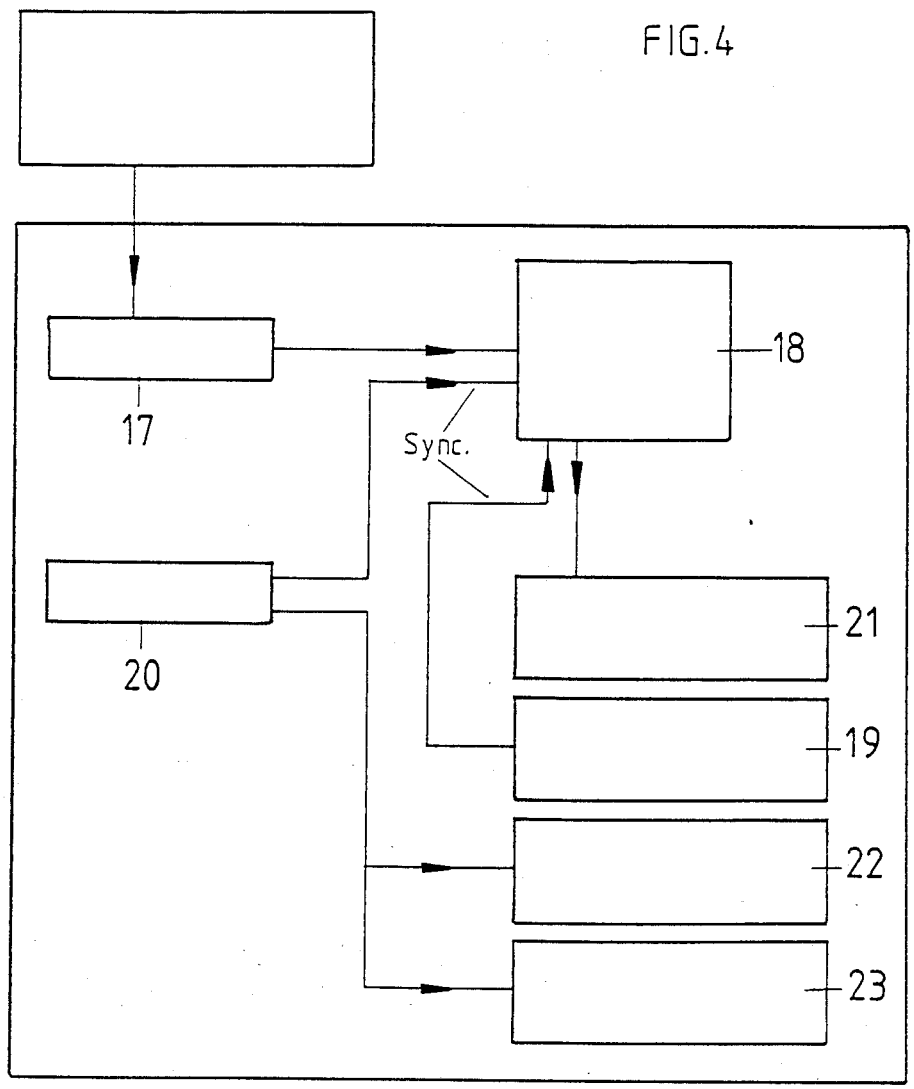
FIG. 4 shows a flow-chart of the method according to the present invention.

In FIGS. 2 and 3, a heat modulated ink carrier ribbon 8 is displaced with a great precision in the area of incident laser beam 2 by transporting rollers 9. A receiving material 10 is displaced by a large transporting cylinder 11 in a predetermined, very small, spaced relationship relative to or in contact with the ink carrier ribbon 8 from which the ink is sublimed upon heating. Small transporting cylinders 12 which engage the large cylinder 11, insure a more precise displacement of the receiving material line by line. At the incidence line of the laser beam 2, the ink carrier ribbon 8 extends tangentially to the transporting cylinder 11. A source of infrared light 13 is located on one side of the laser beam 2. A thermal beam of the infrared light source which passes through a lense 14 or is reflected from reflectors 15, preheats the ink carrier ribbon in the region of a laser beam defined line. Screens 16 are placed between the infrared light source 13 and laser beam 2, on one hand, and between the infrared source 13 and the transporting path of the ink carrier ribbon 8, on the other hand, to prevent heating of regions which are adjacent to the laser beam defined line region.

According to the method of the invention, the ink carrier ribbon is heated by the laser beam linewise and pixelwise. When a very powerful laser is used, scanning the line only one time with the laser beam might suffice for heating up the ink carrier ribbon sufficiently. Thus, the ink carrier ribbon and the receiving material will be equally consecutively treated. However, the cost of a laser is directly proportional to its power. Therefore, it is advantageous to use a somewhat weaker laser 1.

Each pixel will be heated up repeatedly by the laser beam 2 during heating and sublimation phases. In this case, the time interval between two successive scannings must be shorter than the cooling time defined by the thermal inertia of the ink carrier ribbon. An effective use of the emission energy of the laser permits further to reduce the laser power. To this end, an additive, in particular, soot is dispersed on the ink carrier ribbon.

A suitable raster image processor 18 is used to convert a picture tone reproduction into corresponding exposure data for effecting laser modulation 21. Laser modulation 21 as well as pixel clock synchronization 19 and scanning is effected in a known manner.

In order to be able to use a weaker laser for heating the ink carrier ribbon linewise with the laser beam, the line is scanned several times by the laser beam and additionally preheated. To this end, the rays of the infrared light source 13 are focused through a suitable optics (a lens or reflectors with an elliptical cross-section), and a screen 16 on a region immediately adjacent to the laser exposure region. The purpose of the screen 16 is to shield from heating by the infrared source the remaining portion of the ink carrier ribbon 8. This is important for maintaining the mechanical stability of the ink carrier ribbon.

The receiving material transporting system should insure precise positioning of the receiving material within limits of about 30% of pixel diameter for exposure respective lines. Because generally at least three color components (yellow, magenta, cyan, or the like but also black or special colors like fluorescent inks) should be transferred, it is necessary that receiving material 10, after its run, is displaced again with the same precision for transferring another color component. This step is repeated as many times as needed for transferring all color components. In order to achieve the required precision of displacements, guiding of the receiving material can be effected by using perforations.

The ink carrier ribbon transporting system should insure a predetermined spacing between the ink carrier ribbon and the receiving material (within 0-30% of the pixel diameter), on one hand, and on the other hand, the ink carrier ribbon transporting system should provide that, after exposure of one line, a fresh portion of the ink carrier ribbon is displaced into the line exposure region.

In order to keep the total duration of making a copy as small as possible, the raster image processor is so programmed that for each line (for each separate color component) of a copy, a respective maximum density is reproduced. After expiration of the proper exposure time which can be shorter than the time provided in the apparatus for attaining the absolute maximum density, the remaining time can be transferred to another line so that total duration of making a copy is reduced.

According to this method, very large thermocopies can be produced in a relatively shorter time in comparison with thermocopies made with prior art apparatus, i.e., formats DIN A4 and A3.

Electronic image data are transferred through an analog or digital interface from an image source (a color television, camera, computer, videorecorder, image plate, scanner and the like) to an image storage means 17 preferably located within the apparatus for making thermocopies. The raster image processor from the image data calculates exposure data for each pixel linewise for separate color components (yellow, magenta, cyan, and the like, and also black and special colors such as fluorescent colors).

The receiving material 10 is transported from a distributor (paper roll, paper stack) to a printing block. At the same time the ink carrier ribbon transporting system 9 brings the ink carrier ribbon 8 into a position. Both the receiving material and ink carrier ribbon transporting systems are controlled by computer means in accordance with the calculated exposure data. Upon actuation of the apparatus, the image data are linewise retrieved from the raster image processor in accordance with separate color components. The pixel clock 19 serves for modulating the beam of a laser 1 (i.e., NdYAG-laser), in accordance with the position of a scanning element (i.e., rotatable polygon mirror 3) to such an extent that a respective ink carrier ribbon element is heated to a degree corresponding to a desired tone level. The laser modulation can be effected as from outside (i.e., with acoustooptical modulator 21) so from inside (i.e., with LED-pumped NdYAG laser). During heating before the sublimation phase as well as during the sublimation phase itself, each pixel of the same exposed line is heated several times by the laser beam 2 so that the frequency of recurrence is high and compares with the thermal inertia of portions of ink carrier ribbon, and the time interval between two consecutive scanning is less than the cooling time resulting from the thermal inertia of the ink carrier ribbon.

The image sharpness of the objective 7 located downstream of the scanning element 3 should be such that focus diameter lies within about 2-90 um. This means that the resolution is about 300 dpl.

After the highest ton level in the exposed line is reached, a line feed for the receiving material and for the ink carrier ribbon follows, and the exposure of the next line is effected in a manner described above. In this manner, all lines and color components are treated. A ready copy is placed in a stack or distribution basket.

While the invention has been illustrated and described with reference to a specific thermocopying apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications wihout omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of producing a thermocopy by a thermosublimation transfer, said method comprising the steps of:
    advancing a receiving material into a sublimation area;
    bringing an ink carrier member into the sublimation area opposite the receiving material in a predetermined relationship relative thereto, the ink carrier member being heated in the sublimation area pixelwise for transferring an ink layer of a predetermined density from the ink carrier member to the receiving member;
    heating the ink carrier member with a laser beam linewise to provide for heating the ink carrier member pixelwise; and
    modulating the laser beam in accordance with the predetermined density of the ink layer.

2. A method according to claim 1, wherein said modulating step includes modulating the laser beam several times over the same line during heating and sublimation phases, each pixel being scanned and heated several times with the laser beam, a time interval between two consecutive scannings of the same pixel being shorter than cooling time of the ink carrier member resulting from thermal inertia of the ink carrier member.

3. A method according to claim 1, further comprising the step of preheating lines scanned by the laser beam with an infrared light beam along a total length of a respective line.

4. A method according to claim 1, further comprising the step of providing the ink carrier member with a beam energy absorbing additive.

5. A method according to claim 4, wherein said step of providing the ink carrier member with an energy absorbing additive includes providing the ink carrier member with soot.

6. A method according to claim 1, wherein said step of bringing an ink carrier member into the sublimation area includes bringing into the sublimation area successive different ink carrier members carrying different color ink components for transferring the different color ink components consecutively to the receiving material; said heating step includes linewise scanning with the laser beam the different ink carrier members; and said advancing step includes advancing of the receiving material in such a manner that each separate color pixel, at scanning with the laser beam, is transferred to the receiving material to the same spot and has the same diameter.

7. A method according to claim 6, wherein said modulating step includes modulating the laser beam to such an extent that density of the ink layer of each color pixel transferred to the receiving material is such that a halftone copy is produced.

8. A method according to claim 4, wherein said step of advancing the receiving material includes advancing the receiving material for positioning it in the sublimation area with a precision of about 30% of a pixel diameter for scanning a respective line.

9. A method according to claim 1, wherein said step of bringing an ink carrier member into the sublimation area opposite the receiving material in a predetermined relationship relative thereto includes maintaining the pedetermined spaced relationship at linewise scanning within 0-30% of a pixel diameter.

10. A method according to claim 1, wherein said step of heating the ink carrier member with a laser beam includes providing a laser beam with a focus diameter of 2-90 um.

11. An apparatus for making thermocopies by thermosublimation transfer of ink from an ink carrier member to a receiving material, said apparatus comprising means for synchronously displacing the receiving material and the ink carrrier member in a predetermined relationship therebetween; means for linewise and pixelwise heating of the ink carrier member, said heating means comprising means for providing a laser beam movable along a respective line of the ink carrier member; and means for modulating said laser beam in accordance with a predetermined density of an ink layer.

12. An apparatus according to claim 11, further comprising infrared light means located adjacent a path of the laser beam for preheating an ink carrier member portion corresponding to a line scanned by the laser beam.

13. An apparatus according to claim 11, further comprising screen means for preventing heating of an ink carrier member area located outside the scanned line by an infrared light beam.

14. An apparatus according to claim 11, further comprising image storage means for storing image copying data in one of analog and digital forms; a raster image processor connected with said storage means for calculating linewise exposure data for each heated pixel for each color component in accordance with the image data; means for modulating the laser beam; a pixel clock connecting said raster image processor and said modulating means; and means for controlling said displacement means in accordance with the exposure data calculated by said raster image processor.

* * * * *